United States Patent
Amend et al.

(10) Patent No.: US 9,548,985 B2
(45) Date of Patent: Jan. 17, 2017

(54) NON-INVASIVE CONTEXTUAL AND RULE DRIVEN INJECTION PROXY

(75) Inventors: Michael Ryan Amend, Frisco, TX (US); David P. Meyer, San Francisco, CA (US); Joseph A. Stanko, El Cerrito, CA (US); Phani Pandrangi, San Jose, CA (US); Adrian Peter McDermott, San Francisco, CA (US); Don L. Hayler, Palo Alto, CA (US); Thomas Doyle Quigley, Oakland, CA (US); Stanley Hsinheng Lin, San Francisco, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1425 days.

(21) Appl. No.: 12/207,341

(22) Filed: Sep. 9, 2008
(Under 37 CFR 1.47)

(65) Prior Publication Data
US 2009/0083726 A1    Mar. 26, 2009

Related U.S. Application Data

(60) Provisional application No. 60/974,013, filed on Sep. 20, 2007.

(51) Int. Cl.
*G06F 9/445* (2006.01)
*H04L 29/06* (2006.01)
*H04L 29/08* (2006.01)

(52) U.S. Cl.
CPC ............ *H04L 63/105* (2013.01); *H04L 67/02* (2013.01); *H04L 67/2838* (2013.01)

(58) Field of Classification Search
CPC ..... H04L 63/105; H04L 67/2838; H04L 67/02
USPC .................................................. 717/168, 171
See application file for complete search history.

(56) References Cited

U.S. PATENT DOCUMENTS

| | | | |
|---|---|---|---|
| 6,564,243 B1 | 5/2003 | Yedidia |
| 6,617,969 B2 | 9/2003 | Tu |
| 6,631,363 B1 | 10/2003 | Brown |
| 6,934,955 B2 | 8/2005 | Nickum |
| 7,010,581 B2 | 3/2006 | Brown |
| 7,107,526 B1 | 9/2006 | Weller |
| 7,155,514 B1 | 12/2006 | Milford |

(Continued)

FOREIGN PATENT DOCUMENTS

| | | |
|---|---|---|
| WO | WO03003700 | 1/2003 |
| WO | WO2008073812 | 6/2008 |

OTHER PUBLICATIONS

O'Reilly Media, "Notification Services", 5 pages, MS SQL Server. Retrieved on Nov. 6, 2008, http://www.aspfree.com/c/a/MS-SQL-Server/Notification-Services/.

(Continued)

*Primary Examiner* — Wei Zhen
*Assistant Examiner* — Mohammed Huda
(74) *Attorney, Agent, or Firm* — Kilpatrick Townsend & Stockton LLP

(57) ABSTRACT

User requests for a web application can be received at a reverse proxy. Web application code for a first application can be obtained. Data can be checked at the reverse proxy to determine whether to insert an element into the first application. If there is a match, a combined web application can be produced, including the first web application and the element.

20 Claims, 4 Drawing Sheets

(56) References Cited

U.S. PATENT DOCUMENTS

| | | | | |
|---|---|---|---|---|
| 2003/0004998 | A1* | 1/2003 | Datta | 707/513 |
| 2004/0205567 | A1 | 10/2004 | Nielsen | |
| 2006/0206589 | A1* | 9/2006 | Lentini et al. | 709/219 |
| 2008/0005125 | A1 | 1/2008 | Gaedeke | |
| 2008/0126884 | A1 | 5/2008 | Stempfer | |
| 2008/0148383 | A1 | 6/2008 | Pitchaikani | |
| 2008/0189513 | A1* | 8/2008 | Hutson | 712/7 |
| 2008/0218318 | A1 | 9/2008 | Boss | |
| 2008/0235671 | A1 | 9/2008 | Kellogg | |

OTHER PUBLICATIONS

Expressminds, 2 pages. Retrieved on Nov. 6, 2008, http://www.expressminds.net/services.html.

Nitroview Logcaster, Compliant Log Collection, Storage and Management, 3 pages. Retrieved on Nov. 6, 2008, http://nitrosecurity.com/products/nitroview/logcaster/.

Logmeister, "Log Reader With Monitoring & Alerting Capability", 2008, 3 pages. Retrieved on Nov. 6, 2008, http://www.tlhouse.co.uk/LogMeister/logmeister_info.shtml.

XEP-0021: Jabber Event Notification Service (ENS), "A Generic Publish-and-Subscribe Service for Jabber", 11 pages. Retrieved on Nov. 6, 2008, http://xmpp.org/extensions/xep-0021.html.

Mac-Os X Hints "Growl—An Event Notification System" 3 pages. Retrieved on Nov. 6, 2008, http://www.macosxhints.com/article.php?story=20070926092609653.

Gruber, et al., "High-Level Constructs in the READY Event Notification System", 8 pages. Retrieved on Nov. 6, 2008, http://reference.kfupm.edu.sa/content/h/i/high_level_constructs_in_the_ready_event_1242795.pdf.

Drury, "The CORBA Notification Service: JacORB and TAO Interoperability", Jun. 2002, 12 pages. Retrieved on Nov. 6, 2008, http://www.ociweb.com/cnb/CORBANewsBrief-200206.html.

Forbes.com, "Enea Announces Enhanced Alarm and Notification Services for Enea Element Middleware", Oct. 21, 2008, 3 pages. Retrieved on Nov. 6, 2008, http://www.forbes.com/businesswire/feeds/businesswire/2008/10/21/businesswire20081021005520r1.html.

Simon, et al., "WebSphere Everyplace Access Intelligent Notification Service Part 1: Setting up and Configuring Components", Nov. 20, 2003, 8 pages. Retrieved on Nov. 6, 2008, http://www-128.ibm.com/developerworks/websphere/library/techarticles/0311_patterson/patterson1.html.

FRSIRT, "Security Alerting and Vulnerability Management Solutions", 2 pages, Retrieved on Nov. 6, 2008, http://www.frsirt.com/english/services/.

Mircosoft, "Notification Services in SQL Server 2005", 2005, 2 pages. Retrieved on Nov. 6, 2008, http://www.microsoft.com/Sqlserver/2005/en/us/notification-services.aspx#resources.

NUXEO, "User Notification Service", 2 pages. Retrieved on Nov. 6, 2008, http://www.nuxeo.com/en/products/sp/user-notification/.

Pilgrim, "Dive Into Grease Monkey", 2005, 4 pages. Retrieved on Nov. 6, 2008, http://diveintogreasemonkey.org/toc/index.html.

Manalang, "Introducing MonkeyGrease: The Server-Side Greasemonkey", Nov. 8, 2005, 4 pages. Retrieved on Nov. 6, 2008, http://www.theserverside.com/news/thread.tss?thread_id=37475.

* cited by examiner

NON-INVASIVE CONTEXTUAL AND RULE DRIVEN INJECTION PROXY

CLAIM OF PRIORITY

This application claims priority to U.S. Provisional Application No. 60/974,013 entitled "NON-INVASIVE CONTEXTUAL AND RULE DRIVEN INJECTION PROXY" by Amend et al., filed Sep. 20, 2007, which is hereby incorporated by reference.

BACKGROUND OF INVENTION

Web applications have become increasingly popular within the enterprise as a result of their flexibility of deployment and their relatively intuitive interfaces, but web applications present potential problems in the enterprise environment due to security and governance issues.

FIGURES

DETAILED DESCRIPTION

Some embodiments of the present invention may be useful in reverse proxy and Single Sign On (SSO) environments.

Figure 4:
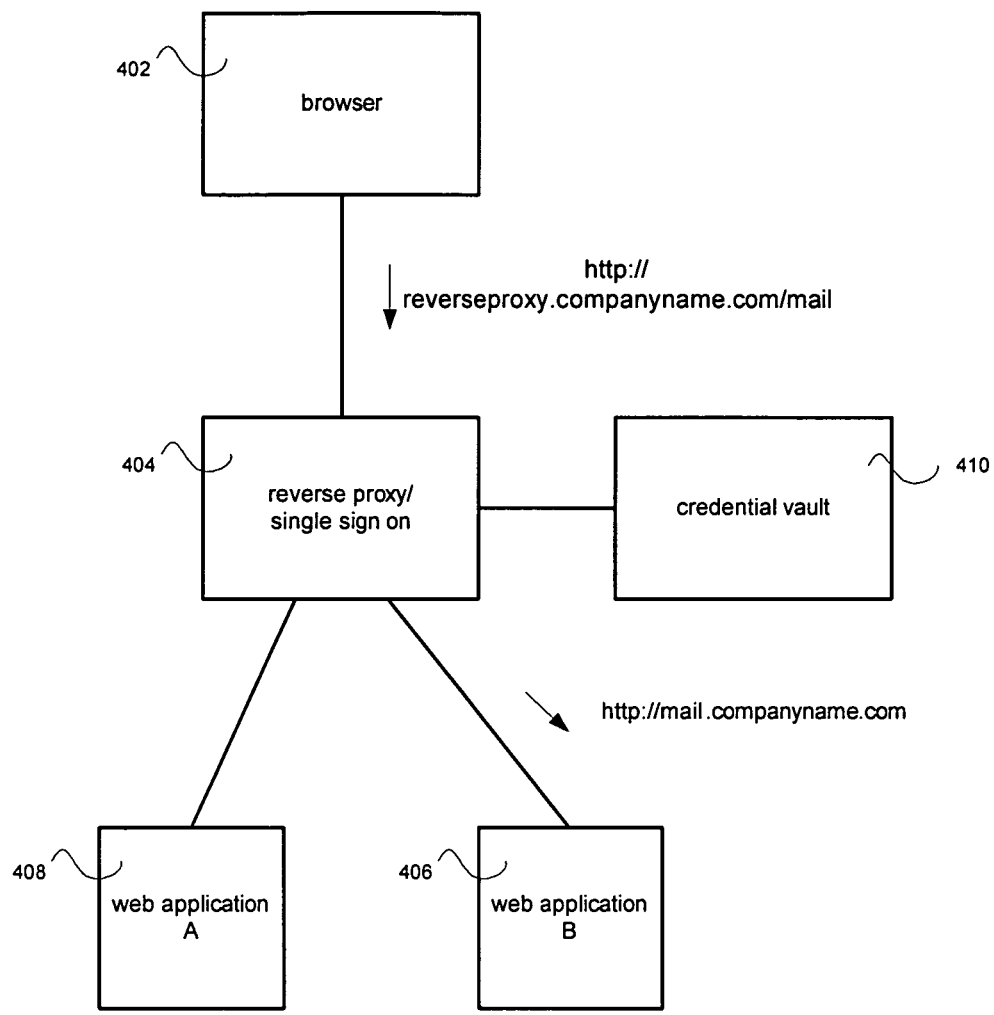
FIG. 4 is a diagram of an exemplary reverse proxy, single sign-on environment.

FIG. 4 shows an exemplary reverse proxy, single-sign-on environment. A user browser 402 can access functionality through the reverse proxy 404. In the example of FIG. 4, a request for "http://reverseproxy.companyname.com/mail" is sent to the reverse proxy 104 and mapped to a resource 406 at "http://mail.companyname.com". In one embodiment, the reverse proxy 404 can be set up to access the web application instances 406 and 408.

For purposes of this application a reverse proxy can be any system that can do such a reverse mapping. In one embodiment, a reverse proxy is a server that proxies content from a remote web application to an end-user and may or may not modify that content.

No additional or supplemental functionality, such as SSO, should be imputed to the meaning of the term "Reverse Proxy" or "Proxy".

Supplemental functionalities can include authentication to determine who the user is; authorization to determine if the user has access to the requested resources; transformation functionality to use tags to combine data from different applications, such as web applications and/or rewrite URLs within a response to point to the reverse proxy 404. The functionality can also include gathering analytics and auditing data.

Authentications and authorizations can be part of a SSO system such that all requests through the reverse proxy 104 only require a single sign on.

Authorization can be done by having the reverse proxy 404 handle the mapping of users for a web application to roles. In one embodiment, the web applications can use different roles while the mapping of users to user can be controlled by the reverse proxy 404.

In one embodiment, different types of authentication can be ranked in order of security. The authentication can be used to access the application if the SSO authentication has a security authorization at or above that required by the application.

The use of a reverse proxy can also allow for centralized governance. The reverse proxy can keep a central record of web application usage statistics.

Single sign on can be enabled by having the reverse proxy 404 send credentials (such as user names and passwords) from a credential vault 410 to the application.

In an exemplary case, the rewriting of URLs can be done by checking the URL for a prefix mapped by the reverse proxy and then converting the prefix to point to the reverse proxy. For example, "http://mail.companyname.com/billing" can be converted to "http://reverseproxy.companyname.com/mail/billing".

One embodiment of the present invention is a non-invasive way to insert elements into a web page. In some cases, it is desired to not modify the source code of a web page. For example, the web application may be obtained from a third party or it can be otherwise undesirable or difficult to modify the web application code. In this embodiment, a server, such as a reverse proxy, can search for an identifier, such as a name or a code pattern, in the web page and then use this identifier to determine whether to insert an element into the web page.

The inserted element can be a pagelet as described in the patent application Ser. No. 11/765,394, incorporated here by reference. The inserted element can also be static HTML. In that case, the static HTML can be stored in a table at the server.

The inserted element can be an additional web application that can be injected into the displayed web page.

Currently there is no way to inject content, user interface markup (html), widgets, etc without directly modifying the existing application code or creating an entirely new application from scratch—which is almost always either impossible or impractical because of the time required.

Embodiments of the present invention concern a declarative non-invasive injection. Such a system can be policy driven.

By supporting this externalized approach to application composition, enrichment, mashups, aggregation, etc—any packaged and custom applications can be enhanced with no modification to the end application code itself.

Figure 1:
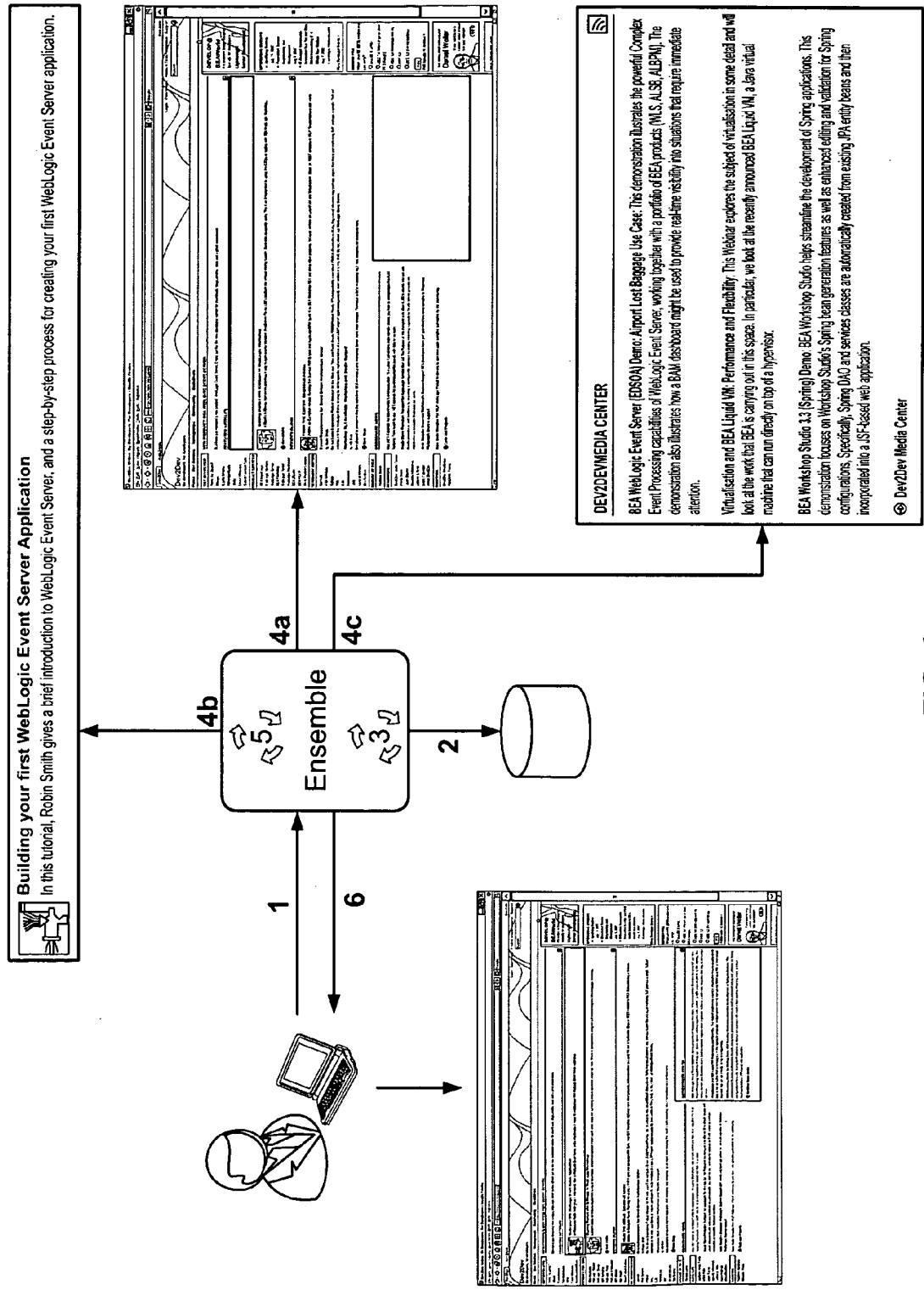
FIG. 1 is a diagram that shows a high level example of a non-invasive injection proxy.

FIG. 1 shows a high level explanation of one example.

Step 1: User enters the application's URL in the browser—like www.bea.com which is registered to a reverse proxy, such as Ensemble.

Step 2: The reverse proxy can intercept this request and then query the database to get the resource mapping, all injection rules, and policies associated to this requested resource (URL).

Step 3: If this resource (URL) has injection rules defined, the reverse proxy can first evaluate the associated policy or policies for each injection rule to determine which rules should be executed on the requested resource (URL).

Step 4a: The reverse proxy can dispatch the request for the resource the user has requested, which is determined by the resource mapping in Ensemble—ex:
www.bea.com→internal.bea.com Step 4b, c: The reverse proxy can dispatch parallel request(s) over HTTP(S) for each dynamic type injection rules required for the targeted resource requested by the user. For static type injection rules, straight markup can be injected which is stored in the database.

Step 5: The reverse proxy can take the markup from the requested (target) resource and apply each injection rule(s).

To apply an injection rule, the node selectors can be executed by the reverse proxy until a match is found, then the markup from that rule can be injected at the location [before, after, between] at the point where the selector has identified in the DOM-TREE of the requested (targeted) resource's markup.

Step 6: The combined markup from all resources can be combined together based on the rules to return a single document which can be rendered by the browser containing code (markup or content) from potentially multiple applications or sources.

Figure 2:
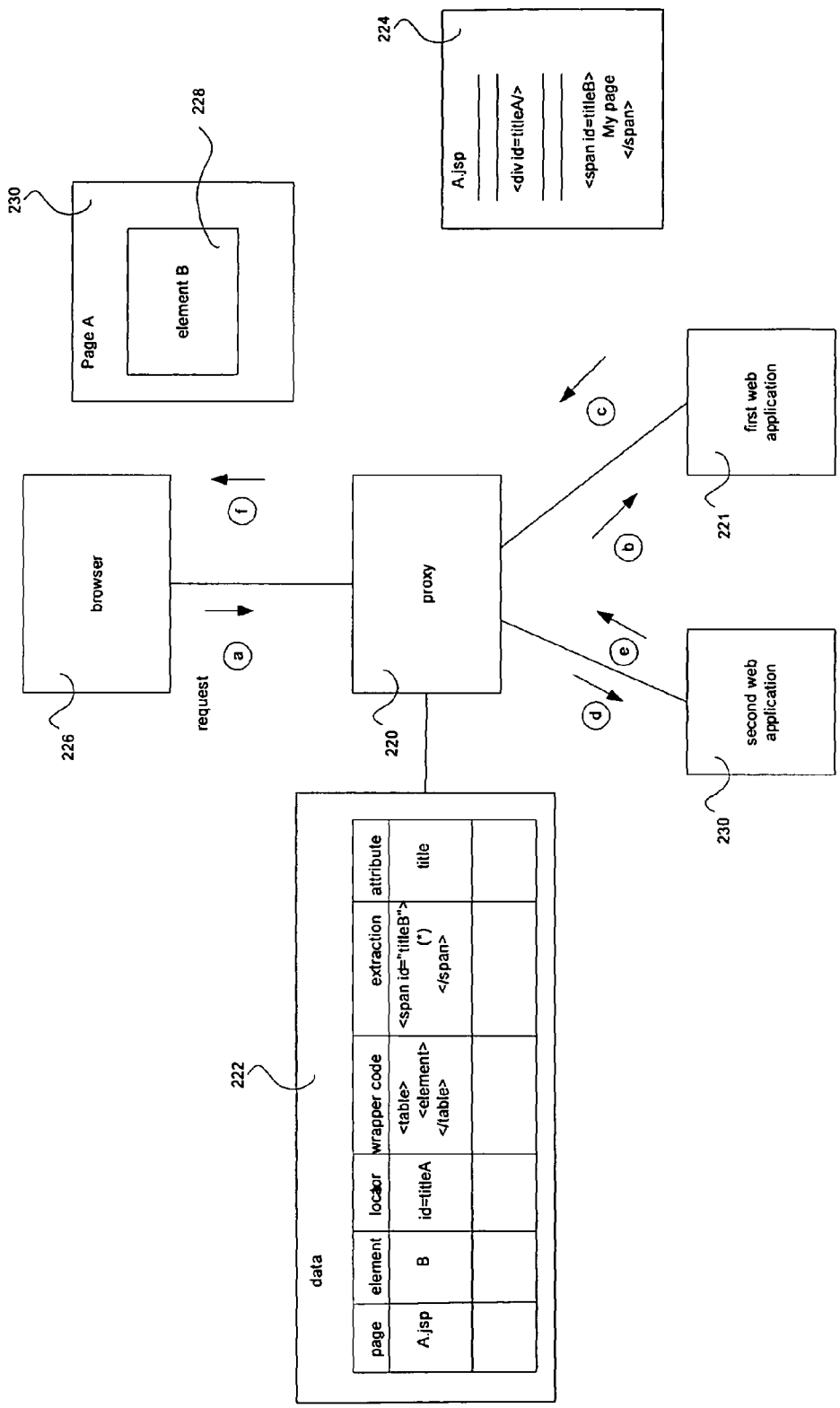
FIG. 2 is a diagram of a system of the present invention.

FIG. 2 shows one example of a non-invasive insertion method. In this example, server 220 keeps a table 222, or other data structure, that indicates what web page(s) an element is to be inserted into. The table 222 can include an indication of the page that the element is to be inserted into and an indication of the element to be inserted. In the example of FIG. 2, the table 222 indicates page "A.JSP" and element "B". When page "A.JSP" 224 is obtained by the server 220 from source 221 to send to a browser 226, element "B" 228 can be inserted into the displayed page 230.

The table 222 can also include a location indicator that can indicate to proxy 220 where in the web page to insert the pagelet.

The indication of page and location can be by pattern matching. For example, a search string can be indicated and each page with the string can have the element inserted. In one embodiment, the web page indication can use Boolean operators such as "AND" and "OR". Alternatively, static HTML can be inserted into the page directly. In one embodiment, a DOM-Tree is used to determine the position that the element is inserted into the page.

Optionally, the table 222 can also indicate wrapper code for the element. In the example of FIG. 2, the wrapper code indicates that the element is to be inserted into a table on the web page. The use of wrapper code can help the pagelet be used in different display contexts.

The table 222 can also optionally include attributes that are to be obtained from the page and provided to the element, such as a pagelet. In the example of FIG. 2, the attribute is a title that is obtained from the web page and provided to the pagelet for display. This example shows extraction info and attribute name. The string indicated by the extraction info on the web page is given the value indicated by the attribute and then given to the pagelet. More than one attribute/extraction pair can be used to provide attributes to a single element.

Looking at FIG. 2, in one embodiment, in step A, a request is received at server 220 for the first web application. The server 220 can get the web application code from the first web application 221 in steps B and C. The server 120 can then use the data 122 to determine whether a pagelet is to be inserted.

In the example of FIG. 2, web page code 224 is a page that a pagelet is to be inserted into. In steps D and C, the pagelet is obtained from pagelet web application 230. In step E, the pagelet 228 (pagelet B) is inserted into page 230 (Page A) to produce a combined application that is sent to the browser 226.

One embodiment of the present invention comprises determining a second web application by recognizing a particular page in a first web application to indicate a pagelet web application and inserting the second web application into a pre-configured section of a page of the first web application. The first web application page and the location to insert the second web application can be determined either programmatically or by specifying a specific page or location directly. This embodiment allows a second web application code to be inserted into a first web application, where the first web application code has not been modified prior to the first web application being proxied.

Figure 3:
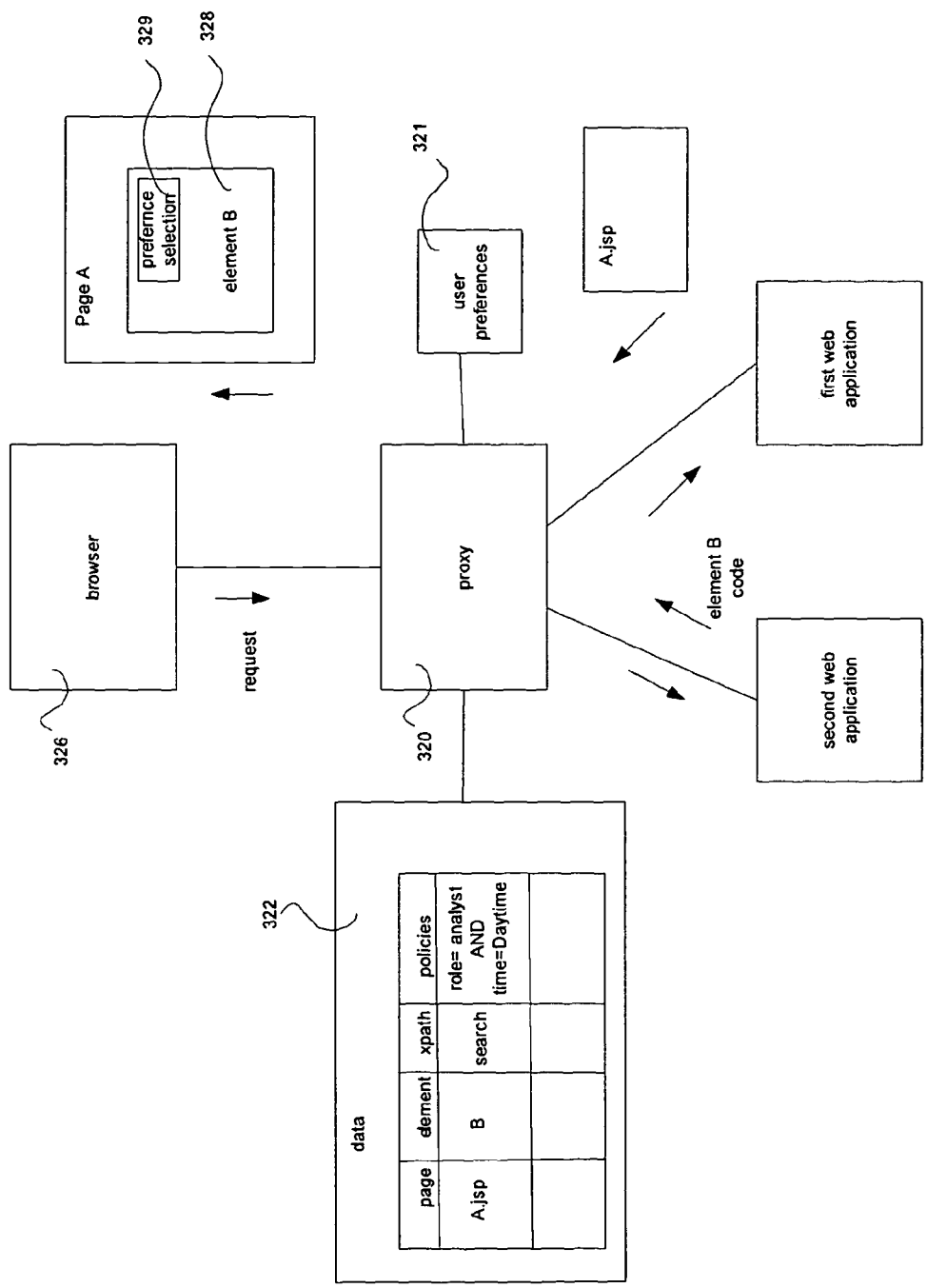
FIG. 3 is a diagram of a system of the present invention.

FIG. 3 shows an example that shows the use of a DOM-TREE based insertion. The table 322 can include an X-path expression for DOM-TREE location of the inserted element B.

Also shown is a policy. An exemplary policy can include the display of the injected element to users based on the requested user's role or some other information. In this example, the server 320 will insert the "element B" into the page only if the policy (Role=Analyst and Time=Daytime) is met. This means that the system has flexibility in the presentation of the elements to the users. Certain users can be selected to have the element displayed while others will not have the element displayed. Time and other policy information can be used to determine whether to display the element.

The server 320 can also have access to user preferences 321. The user preferences 321 can be set by the user to control the display of the element. For example, the element 328 (Element B) can have a preference selection 329 that indicates information such as whether the element B is to be displayed, as well as the size, or the location of the display of element B.

The server 320 can keep track of the preferences by persisting the preferences such as having a cookie sent from the user's browser 326.

In one embodiment, an URL can define the URL(s) for which an injection rule is applied. In one embodiment, type can be [Static|Dynamic]. In one embodiment, content is only defined for static type rules (literal injected markup). Description can be an injection rule description for administrators or developers.

NodeSelectors of one embodiment:
Type—[XPath, Text Match, Regular Expression]
Location—[Before, After, Between]
Listing of 1 or more node selectors—each node selection has a type and the associated metadata with that particular type. Ensemble will evaluate selectors until the first match or eventually hit the default "NoMatch" selector which defines that appropriate default action.
Policies of one embodiment:
0,1, or many policies for this injection rule
Injection policy of one embodiment:
User(s)—single user or list of users
Group(s)—single group or list of group
Role(s)—single role or list of roles
Between Dates—between two dates
On Date(s)—on specific date or listing of dates
User Preference(s)—if user preference matches defined value(s)
Between DateTimes—between two datatimes
Between Times—between two times
Externally Defined Function—externally evaluated java function There can also be a means which injection rules can be controlled by the application user which is stored in their profile or preferences so that the user as well can dictate which injection definitions get executed per resource.

It can be useful to inject content into pages that can not be edited. Ensemble can enable this. Regular expressions and/or DOM can be used to determine where in a proxied page to inject markup. In one embodiment, injections can occur immediately before the specified location, immediately after it or in place of it. Markup can include anything, including a pagelet or other adaptive tag. Search-inject combinations can be specified in the admin user interface. In one embodiment, specific search-inject combos can be applicable to more than one resource. The search-inject combos can also be enableable/disableable for specific URL patterns in that resource.

HTML, CSS and JavaScript might all be changed in this manner. Substitute markup can be entered directly into the runner admin user interface, or a URL to the substitute markup can be specified.

A resource administrator can insert arbitrary text into a pre-existing webpage without modifying the source HTML. A reverse proxy can overlay the original page with these modifications and send the final result to the browser.

This can allow the owner to add or replace the existing webpage with new features without modifying the source page. It can also be used to remove functionality from a page. The administrator can select what text to look for in the existing page, and the reverse proxy can replace or insert some additional content at that location. The administrator can then select the set of resources that will be injected with this modification.

A single insertion can be applied to a group of resources, making it easy to apply a single change uniformly across a broad scope of web pages. Web Injection need not be limited just to HTML; it can be used to manipulate CSS, Javascript, or any other content that is transferred over HTTP. Examples:
  add HTML divs and new widgets
  modify CSS styles
  alter Javascript logic
  add pagelets This allows for adding or changing functionality on an existing page without modifying the source HTML. This non-invasive change can be of high value in many cases, most notably when:
  the proxied resource is owned by an external party: a different department, a business partner, a public website
  the proxied resource has HTML that is not easily modified because it is generated by an app where the UI is difficult to manipulate
  the owner of the page is unwilling or unable to change the page Use cases can include:
Rebranding an entire site by replacing all existing icons, CSS stylesheets, and instances of the product name
  add Dojo to a non-Dojo page
  add Help balloons or context-help to an existing page
  add search to a page that does not have it
  add a pagelet that does a user directory look up, based on content on the page
  add links to Help pages, Wikis, or other useful sites
  add announcements and news to a page
Optionally:
  doing web injection can be done into pagelets in a second page
  ordered HTML injection can be done into a resource In one embodiment, this feature can have three major components: The persistent objects, AdminUI component, and the algorithm to inject.

The top-level persistent object can be an Injector Set, which can contain a series of related web injectors. These can be then attached to one or more resources.
  Web Injector Set Persistent Object can be:
  name, description, etc
  a set of WebInjectorObjects
  Web Injector Persistent Object can be:
  a string that indicates the place in the page where the injection should occur. This can be called the intercept
  how to insert (whether to replace or insert once the intercept is found). This can be called the inject mode
  what text to insert On a Resource page, there can be a sub-tab where the user can select which Web Injector sets to attach to the resource, along with which subset of pages each web injector set applies.
  Resource Persistent Object can be:
  a set of Resource-WebInjectorSet Links
  Resource-WebInjectorSet Link can be:
  sub resource, ex. host:8080/communities/*
  Web Injector Set
  AdminUI can include adding such as:
  AdminUI Configuration:
  subtab of Resource to pick Injectors
  subtab of Application to search for Injectors and delete injectors
  panels in Injectors subtab to create and modify Injectors
  For Locations, different selection methods can include:
  regex
  basic
  diff tool
  Scoping:
    this string
    inside this tag
    contents of this tag
  Action: insert after, before, or replace
  Injection: text to replace with An Intercept Algorithm can be used. There are several ways to find a match in a page. These can include candidates are regular expression matching, simple string matching, and applying a Unix-style Diff tool. In some embodiments, DOM parsing may not be performant, and more importantly, specifying a DOM location can be brittle and could easily break if the target page was revised in superficial ways.

In one embodiment, the injection string can be inserted during a PTTransformer module phase, as soon as HTML is retrieved, before pagelets are processed. This allows for pagelets to be injected into a page. How to apply multiple injectors in the same page at once is a performance concern we must look at.

Exemplary Sequence of Events
During injection, the following actions can be taken:
1. does this page have injectors that apply to it?
  for each injector
  Does this injector have a match in the page?
  Inject Performances of the injection are important, since this feature will be invoked during proxy requests of resources.

Embodiments of the present invention can include computer-based methods and systems which may be implemented using conventional general purpose or a specialized digital computer(s) or microprocessor(s), programmed according to the teachings of the present disclosure. Appropriate software coding can readily be prepared by programmers based on the teachings of the present disclosure.

Embodiments of the present invention can include a computer readable medium, such as computer readable storage medium. The computer readable storage medium can have stored instructions which can be used to program a computer to perform any of the features present herein. The storage medium can include, but is not limited to, any type of disk including floppy disks, optical discs, DVD, CD-ROMs, micro drive, and magneto-optical disks, ROMs, RAMs, EPROMs, EEPROMs, DRAMs, flash memory or any media or device suitable for storing instructions and/or data. The present invention can include software for controlling both the hardware of a computer, such as general purpose/specialized computer(s) or microprocessor(s), and for enabling them to interact with a human user or other mechanism utilizing the results of the present invention. Such software may include, but is not limited to, device drivers, operating systems, execution environments/containers, and user applications.

Embodiments of the present invention can include providing code for implementing processes of the present invention. The providing can include providing code to a user in any manner. For example, the providing can include transmitting digital signals containing the code to a user; providing the code on a physical media to a user; or any other method of making the code available.

Embodiments of the present invention can include a computer-implemented method for transmitting the code which can be executed at a computer to perform any of the processes of embodiments of the present invention. The transmitting can include transfer through any portion of a network, such as the Internet; through wires, the atmosphere or space; or any other type of transmission. The transmitting can include initiating a transmission of code; or causing the code to pass into any region or country from another region or country. A transmission to a user can include any transmission received by the user in any region or country, regardless of the location from which the transmission is sent.

Embodiments of the present invention can include a signal containing code which can be executed at a computer to perform any of the processes of embodiments of the present invention. The signal can be transmitted through a network, such as the Internet; through wires, the atmosphere or space; or any other type of transmission. The entire signal need not be in transit at the same time. The signal can extend in time over the period of its transfer. The signal is not to be considered as a snapshot of what is currently in transit.

The forgoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps preformed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular used contemplated. It is intended that the scope of the invention be defined by the claims and their equivalents.

What is claimed is:

1. A method comprising:
   storing, by one or more computer systems hosting a reverse proxy, in a database, an injection rule for a web application, wherein the injection rule identifies injection code and an injection location to insert the injection code in web application code of the web application, wherein the injection rule and the injection code are not generated by processing the web application code;
   receiving, at the one or more computer systems hosting a reverse proxy, a request for the web application identified by a uniform resource locator;
   in response to receiving the request for the web application, querying, by the one or more computer systems hosting the reverse proxy, the database to obtain the injection rule;
   receiving, by the one or more computer systems hosting the reverse proxy, the web application code from an application server in communication with the reverse proxy using the uniform resource locator;
   receiving, at the one or more computer systems hosting the reverse proxy, the injection code; and
   generating, with one or more processors associated with the one or more computer systems hosting the reverse proxy, a response to the request for the web application by creating response web application code by combining the web application code with the injection code injected into the web application code at the location specified by the injection rule.

2. The method of claim 1, wherein the injection code comprises a pagelet application.

3. The method of claim 1, wherein the injection code comprises static HTML.

4. The method of claim 1, wherein the infection code comprises a second web application.

5. The method of claim 1, wherein the location in the web application code in which to insert the application injection code comprises a DOM-TREE reference.

6. The method of claim 1, wherein generating the response to the request further includes applying one or more user preferences to determine whether to insert the injection code into the web application code.

7. The method of claim 1, further comprising searching for the location in the web application code using a pattern matching indication or a document object model indication.

8. A reverse proxy system comprising:
   a processor; and
   a memory in communication with the processor, the memory storing a set of instructions, which when executed by the processor cause the processor to:
   store an injection rule for a web application in a database, wherein the injection rule identifies injection code and an injection location to insert the injection code in web application code of the web application, wherein the injection rule and the injection code are not generated by processing the web application code;
   receive a request for the web application identified by a uniform resource locator;
   in response to receiving the request for the web application, querying the database to obtain the injection rule;
   receive the web application code from an application server in communication with the reverse proxy system using the uniform resource locator;
   receive the injection code; and
   generate a response to the request for the web application by creating response web application code by combining the web application code with the injection code injected into the web application code at the location specified by the injection rule.

9. The reverse proxy system of claim 8, wherein the injection code comprises a pagelet application.

10. The reverse proxy system of claim 8, wherein the infection code comprises static HTML.

11. The reverse proxy system of claim 8, wherein the injection code comprises a second web application.

12. A system comprising:
a processor; and
a memory in communication with the processor, the memory a set of instructions, which when executed by the processor cause the processor to:
store an injection rule for a web application in a database, wherein the injection rule identifies injection code and an injection location to insert the injection code in web application code of the web application, wherein the injection rule and the injection code are not generated by processing the web application code;
receive a request for the web application identified by a uniform resource locator;
in response to receiving the request for the web application, querying the database to obtain the injection rule;
receive the web application code from an application server in communication with a reverse proxy using the uniform resource locator;
receive the injection rule code; and
generate a response to the request for the web application by creating response web application code by combining the web application code with the injection code injected into the web application code at the location specified by the injection rule;
wherein a DOM-TREE is used to determine where to insert the infection code.

13. The system of claim 12, wherein the injection code comprises a pagelet application.

14. The system of claim 12, wherein the infection code comprises static HTML.

15. The system of claim 12, wherein the infection code comprises a second web application.

16. A non-transitory machine-readable medium for a reverse proxy computer system, the non-transitory machine-readable medium having stored thereon a series of instructions executable by a processor, the series of instructions comprising:
instructions that cause the processor to store an injection rule for a web application in a database, wherein the injection rule identifies injection code and an injection location to insert the injection code in web application code of the web application, wherein the injection rule and the injection code are not generated by processing the web application code;
instructions that cause the processor to receive a request for the web application identified by a uniform resource locator;
instructions that cause the processor to, in response to receiving the request for the web application, query the database to obtain the injection rule;
instructions that cause the processor to receive the web application code from an application server in communication with the reverse proxy computer system using the uniform resource locator;
instructions that cause the processor to receive the injection code; and
instructions that cause the processor to generate a response to the request for the web application by creating response web application code by combining the web application code with the injection code injected into the web application code at the location specified by the injection rule;
wherein a DOM-TREE is used to determine where to insert the injection code.

17. The non-transitory machine-readable medium of claim 16, wherein the injection code comprises a pagelet application.

18. The non-transitory machine-readable medium of claim 16, wherein the injection code comprises static HTML.

19. The non-transitory machine-readable medium of claim 16, wherein the infection code comprises a second web application.

20. A non-transitory machine-readable medium for a reverse proxy computer system, the non-transitory machine-readable medium having stored thereon a series of instructions executable by a processor, the series of instructions comprising:
instructions that cause the processor to store an injection rule for a web application in a database, wherein the injection rule identifies injection code and an injection location to insert the injection code in web application code of the web application, wherein the injection rule and the injection code are not generated by processing the web application code;
instructions that cause the processor to receive a request for the web application identified by a uniform resource locator;
instructions that cause the processor to, in response to receiving the request for the web application, query the database to obtain the injection rule;
instructions that cause the processor to receive the web application code from an application server in communication with the reverse proxy computer system using the uniform resource locator;
instructions that cause the processor to receive the injection code; and
instructions that cause the processor to generate a response to the request for the web application by creating response web application code by combining the web application code with the injection code injected into the web application code at the location specified by the injection rule.

* * * * *